United States Patent
Fujikake et al.

(10) Patent No.: US 6,869,994 B1
(45) Date of Patent: Mar. 22, 2005

(54) CARBOXYLATED POLYMER COMPOSITION

(75) Inventors: Masato Fujikake, Himeji (JP); Shigeki Hamamoto, Himeji (JP); Tomoki Kawakita, Himeji (JP); Masatoyo Yoshinaka, Himeji (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 35 days.

(21) Appl. No.: 10/009,687

(22) PCT Filed: Jun. 8, 2000

(86) PCT No.: PCT/JP00/03744

§ 371 (c)(1),
(2), (4) Date: Dec. 13, 2001

(87) PCT Pub. No.: WO00/77093

PCT Pub. Date: Dec. 21, 2000

(30) Foreign Application Priority Data

Jun. 15, 1999 (JP) .......................... 11-168176

(51) Int. Cl.[7] .................................. C08K 5/10
(52) U.S. Cl. .................. 524/317; 524/111; 524/310; 524/753; 524/760; 524/761; 524/773; 526/317.1
(58) Field of Search ................. 524/111, 310, 524/317, 753, 760, 761, 773; 526/317.1

(56) References Cited

U.S. PATENT DOCUMENTS

| 2,923,692 | A | | 2/1960 | Ackerman et al. | |
|---|---|---|---|---|---|
| 2,958,679 | A | | 11/1960 | Jones | |
| 3,426,004 | A | | 2/1969 | Wagner | |
| 4,375,533 | A | * | 3/1983 | Park et al. | 526/193 |
| 4,419,502 | A | * | 12/1983 | Sehm | 526/209 |
| 4,420,596 | A | * | 12/1983 | Lochhead et al. | 526/212 |
| 4,692,502 | A | * | 9/1987 | Uebele et al. | 526/193 |
| 4,888,367 | A | * | 12/1989 | Quigley et al. | 524/17 |
| 4,973,632 | A | * | 11/1990 | Nagasuna et al. | 526/200 |
| 5,349,030 | A | * | 9/1994 | Long et al. | 525/450 |
| 5,416,158 | A | * | 5/1995 | Santhanam et al. | 524/760 |
| 6,254,990 | B1 | * | 7/2001 | Ishizaki et al. | 428/402 |
| 6,528,575 | B1 | | 3/2003 | Schade et al. | |

FOREIGN PATENT DOCUMENTS

| EP | 0 349 240 A2 | 1/1990 | |
|---|---|---|---|
| EP | 0 436 960 A | 7/1991 | |
| EP | 0 870 785 A1 | 10/1998 | |
| EP | 0 711 142 B | 11/1998 | |
| JP | 58-084819 | 5/1983 | |
| JP | A8-157531 | 6/1996 | |
| JP | A8-157606 | 6/1996 | |
| JP | A9-157130 | 6/1997 | |
| SU | 767181 B | * 9/1980 | C10M/3/02 |

* cited by examiner

Primary Examiner—Judy M. Reddick
(74) Attorney, Agent, or Firm—Birch, Stewart, Kolasch & Birch, LLP

(57) ABSTRACT

A carboxyl group-containing polymer composition comprising 100 parts by weight of a carboxyl group-containing polymer (A) prepared by copolymerizing an α,β-unsaturated carboxylic acid (a) with a compound (b) having at least two ethylenic unsaturated groups; and 0.01 to 20 parts by weight of at least one compound (B) selected from an ester (c) obtained from a polyhydric alcohol and a fatty acid, and an alkylene oxide adduct of an ester (d) obtained from a polyhydric alcohol and a fatty acid. Since the carboxyl group-containing polymer composition is excellent in the solubility in water and gives the aqueous solution excellent thickening property, the polymer composition can be suitably used as a thickener for various aqueous solutions.

8 Claims, No Drawings

CARBOXYLATED POLYMER COMPOSITION

This application is the national phase under 35 U.S.C. § 371 of PCT International Application No. PCT/JP00/03744 which has an International filing date of Jun. 8, 2000, which designated the United States of America.

TECHNICAL FIELD

The present invention relates to a carboxyl group-containing polymer composition. More specifically, the present invention relates to a carboxyl group-containing polymer composition showing excellent solubility in water and giving the aqueous solution excellent thickening property, which can be suitably used as a thickener for various aqueous solutions.

BACKGROUND ART

Cross-linked carboxyl-group containing polymers have been conventionally used as thickeners for various aqueous solutions. As these cross-linked carboxyl-group containing polymers, there have been known, for instance, a copolymer of an α,β-unsaturated carboxylic acid such as acrylic acid with a polyallyl ether (U.S. Pat. No. 2,923,692); a copolymer of an α,β-unsaturated carboxylic acid with hexaallyltrimethylene trisulfone (U.S. Pat. No. 2,958,679); a copolymer of an α,β-unsaturated carboxylic acid with triallyl phosphate (U.S. Pat. No. 3,426,004); a copolymer of an α,β-unsaturated carboxylic acid with glycidyl methacrylate or the like (Japanese Patent Laid-Open No. Sho 58-84819); and the like.

These cross-linked carboxyl group-containing polymers have been used for applications such as thickeners and suspension stabilizers for emulsions and suspensions by dissolving the polymer in water and neutralizing the solution with an alkali to give a neutralized viscous solution.

In order to use the above-mentioned cross-linked carboxyl group containing polymer for these applications, it is necessary to prepare a homogeneous aqueous solution of the polymer. However, when the cross-linked carboxyl-containing polymer is dissolved in water, undissolved powder lumps tend to be generated, and once the undissolved powder lumps are generated, a gel-like layer is formed on its surface. Therefore, there are some defects such that the rate of penetration of water into the internal of the polymer is delayed, thereby making it difficult to obtain a homogeneous solution. Therefore, when the above-mentioned cross-linked carboxyl group-containing polymer is used, there is necessitated gradual addition of the cross-linked carboxyl-group containing polymer to water under high speed agitation, which is an operation low in production efficiency, in order to prevent the generation of undissolved powder lumps, and in some cases, there is a defect such that a specialized dissolving device for prevention of the generation of undissolved powder lumps is necessitated.

In addition, the higher the viscosity of the above-mentioned neutralized viscous solution is, the wider the applications for thickeners become, and the amount of the viscous solution can be reduced. Therefore, in recent years, it has been earnestly desired to develop a polymer for thickeners giving high viscosities.

DISCLOSURE OF INVENTION

The present invention has been accomplished in view of the above-mentioned prior art. An object of the present invention is to provide a carboxyl group-containing polymer composition showing excellent solubility in water and giving an excellent thickening property to a neutralized viscous solution obtained by neutralizing the aqueous solution of the polymer with an alkali.

The present invention relates to a carboxyl group-containing polymer composition comprising 100 parts by weight of a carboxyl group-containing polymer (A) prepared by copolymerizing an α,β-unsaturated carboxylic acid (a) with a compound (b) having at least two ethylenic unsaturated groups; and 0.01 to 20 parts by weight of at least one compound (B) selected from an ester (c) obtained from a polyhydric alcohol and a fatty acid, and an alkylene oxide adduct of an ester (d) obtained from a polyhydric alcohol and a fatty acid.

BEST MODE FOR CARRYING OUT THE INVENTION

The carboxyl group-containing polymer (A) is prepared by copolymerizing an α,β-unsaturated carboxylic acid (a) with a compound (b) having at least two ethylenic unsaturated groups.

The α,β-unsaturated carboxylic acid (a) is not limited to specified ones, and includes, for instance, olefinic unsaturated carboxylic acids having 3 to 5 carbon atoms such as acrylic acid, methacrylic acid, crotonic acid, maleic acid, itaconic acid and fumaric acid; and the like. These can be used alone or in admixture of at least two kinds. Among them, acrylic acid is preferable because acrylic acid is inexpensive and readily available, and moreover is excellent in water-solubility itself. Also, acrylic acid gives high transparency to a neutralized viscous solution obtained by dissolving the carboxyl group-containing polymer composition in water and neutralizing the solution as described below.

It is desired that the amount of the α,β-unsaturated carboxylic acid (a) in the carboxyl group-containing polymer composition (A) is not less than 90% by weight, preferably not less than 97% by weight, from the viewpoint of suppressing the generation of an insoluble gel in the neutralized viscous solution prepared by using the carboxyl group-containing polymer composition of the present invention, and that the amount is not more than 99.99% by weight, preferably not more than 99.95% by weight, from the viewpoint of improving the thickening property of the above-mentioned neutralized viscous solution. The preferred amount of the α,β-unsaturated carboxylic acid (a) is 90 to 99.99% by weight, more preferably 97 to 99.95% by weight.

The compound (b) having at least two ethylenic unsaturated groups is not limited to specified ones, as long as the compound can be dissolved in an inert solvent mentioned below, and includes, for instance, acrylate esters in which at least two groups of a polyol, such as ethylene glycol, propylene glycol, polyoxyethylene glycol, polyoxypropylene glycol, glycerol, polyglycerol, trimethylolpropane, pentaerythritol, saccharose or sorbitol, are substituted with acrylic acid; methacrylate esters in which at least two groups of a polyol are substituted with methacrylic acid; allyl ethers in which at least two groups of a polyol are substituted; diallyl phthalate, triallyl phosphate, allyl methacrylate, tetraallyloxyethane, triallyl cyanurate, divinyl adipate, vinyl crotonate, 1,5-hexadiene, divinylbenzene, and the like. These can be used alone or in admixture of at least two kinds. Among them, at least one of pentaerythritol tetraallyl ether, tetraallyloxyethane, triallyl phosphate and polyallyl saccharose is preferable, from the viewpoints of giving high thickening property and imparting high suspension stability to an emulsion, a suspension or the like in a small amount.

It is desired that the amount of the compound (b) having at least two ethylenic unsaturated groups in the carboxyl group-containing polymer (A) is not less than 0.01% by weight, preferably not less than 0.05% by weight, from the viewpoint of improving the thickening property of the neutralized viscous solution prepared by using the carboxyl group-containing polymer composition of the present invention, and that the amount is not more than 10% by weight, preferably not more than 3% by weight, from the viewpoint of suppressing the generation of an insoluble gel in the above-mentioned neutralized viscous solution. The preferred amount of the compound (b) having at least two ethylenic unsaturated groups is 0.01 to 10% by weight, more preferably 0.05 to 3% by weight.

When the α,β-unsaturated carboxylic acid (a) is copolymerized with the compound (b) having at least two ethylenic unsaturated groups, there can be added an α,β-unsaturated compound other than the above-mentioned α,β-unsaturated carboxylic acid (a) as a monomer component of the carboxyl group-containing polymer (A), from the viewpoints of increasing thickening property and improving stability of an emulsion or suspension.

The kinds of the above-mentioned α,β-unsaturated compounds are not limited to specified ones. Concrete examples of the α,β-unsaturated compounds include acrylate esters such as alkyl acrylates having an alkyl group of 1 to 30 carbon atoms, such as methyl acrylate, ethyl acrylate, isopropyl acrylate, butyl acrylate, octyl acrylate, 2-ethyl acrylate, decyl acrylate, lauroyl acrylate and stearyl acrylate, and epoxy group-containing acrylates such as glycidyl acrylate; their corresponding methacrylate esters; glycidyl ethers such as vinyl glycidyl ether, isopropenyl glycidyl ether, allyl glycidyl ether and butenyl glycidyl ether; acrylamides such as acrylamide, N-methylacrylamide, N-ethylacrylamide and N-t-butylacrylamide; their corresponding methacrylamides; vinyl esters such as vinyl acetate, vinyl propionate and vinyl benzoate; and the like. These can be used alone or in admixture of at least two kinds.

It is desired that the amount of the above-mentioned α,β-unsaturated compound on the basis of 100 parts by weight of the total amount of the α,β-unsaturated carboxylic acid (a) and the compound (b) having at least two ethylenic unsaturated groups is not less than 0.1 parts by weight, preferably not less than 1 part by weight, from the viewpoints of increasing thickening property and improving stability of an emulsion or suspension by the addition of the α,β-unsaturated compound, and the amount is not more than 20 parts by weight, preferably not more than 10 parts by weight, from the viewpoint of the avoidance of a drastic decrease of the thickening property. The preferred amount of the α,β-unsaturated compound is 0.1 to 20 parts by weight, more preferably 1 to 10 parts by weight.

The compound (B) is at least one of an ester (c) obtained from a polyhydric alcohol and a fatty acid, and an alkylene oxide adduct of an ester (d) obtained from a polyhydric alcohol and a fatty acid. The ester (c) obtained from a polyhydric alcohol and a fatty acid, and the alkylene oxide adduct of an ester (d) obtained from a polyhydric alcohol and a fatty acid can be used alone or in admixture of at least two kinds.

The polyhydric alcohol used in the ester (c) obtained from a polyhydric alcohol and a fatty acid is not limited to specified ones. Preferred examples of the polyhydric alcohol include polyhydric alcohols selected from the group consisting of glycerol, polyglycerol, sorbitol and sorbitan. These can be used alone or in admixture of at least two kinds.

In addition, the preferred examples of the fatty acid in the ester (c) obtained from a polyhydric alcohol and a fatty acid include fatty acids selected from the group consisting of stearic acid, isostearic acid and oleic acid. These can be used alone or in admixture of at least two kinds.

Representative examples of the ester (c) obtained from a polyhydric alcohol and a fatty acid include an ester obtained from glycerol or polyglycerol, and a fatty acid having 10 to 30 carbon atoms. These can be used alone or in admixture of at least two kinds. Among them, an ester obtained from glycerol or polyglycerol, and stearic acid, isostearic acid or oleic acid is preferable.

Concrete examples of a stearate ester include glyceryl stearate, glyceryl distearate, glyceryl tristearate, diglyceryl stearate, tetraglyceryl stearate, tetraglyceryl tristearate, tetraglyceryl pentastearate, hexaglyceryl stearate, hexaglyceryl tristearate, hexaglyceryl pentastearate, decaglyceryl stearate, decaglyceryl distearate, decaglyceryl tristearate, decaglyceryl pentastearate, decaglyceryl heptastearate, decaglyceryl decastearate, and the like. These can be used alone or in admixture of at least two kinds.

Concrete examples of an isostearate ester include glyceryl isostearate, diglyceryl isostearate, decaglyceryl isostearate, decaglyceryl diisostearate, decaglyceryl triisostearate, decaglyceryl pentaisostearate, decaglyceryl heptaisostearate, decaglyceryl decaisostearate, and the like. These can be used alone or in admixture of at least two kinds.

Concrete examples of an oleate ester include glyceryl oleate, glyceryl dioleate, glyceryl trioleate, diglyceryl oleate, diglyceryl dioleate, tetraglyceryl oleate, tetraglyceryl pentaoleate, hexaglyceryl oleate, hexaglyceryl pentaoleate, decaglyceryl oleate, decaglyceryl dioleate, decaglyceryl trioleate, decaglyceryl pentaoleate, decaglyceryl heptaoleate, decaglyceryl decaoleate, and the like. These can be used alone or in admixture of at least two kinds.

Among the esters (c) obtained from a polyhydric alcohol and a fatty acid, decaglyceryl decaoleate, decaglyceryl pentaoleate, decaglyceryl diisostearate, decaglyceryl oleate, hexaglyceryl oleate, tetraglyceryl stearate, diglyceryl oleate and glyceryl trioleate are preferable, because a carboxyl group-containing polymer composition having a desired water solubility can be obtained in a small amount, and a thickening effect is imparted to a neutralized viscous solution prepared by dissolving the carboxyl group-containing polymer composition in water, with maintaining high transparency of the neutralized viscous solution.

The alkylene oxide adduct of an ester (d) obtained from a polyhydric alcohol and a fatty acid is an alkylene oxide adduct of the above-mentioned ester (c) obtained from a polyhydric alcohol and a fatty acid.

The polyhydric alcohol used in the alkylene oxide adduct of an ester (d) obtained from a polyhydric alcohol and a fatty acid is not limited to specified ones. Preferred examples of the polyhydric alcohol used in the alkylene oxide adduct of an ester (d) obtained from a polyhydric alcohol and a fatty acid include polyhydric alcohols selected from the group consisting of glycerol, polyglycerol, sorbitol and sorbitan. These can be used alone or in admixture of at least two kinds.

The preferred examples of the fatty acid in the alkylene oxide adduct of an ester (d) obtained from a polyhydric alcohol and a fatty acid include fatty acids selected from the group consisting of stearic acid, isostearic acid and oleic acid. These can be used alone or in admixture of at least two kinds.

The ester obtained from a polyhydric alcohol and a fatty acid used in the alkylene oxide adduct of an ester (d) obtained from a polyhydric alcohol and a fatty acid include an ester obtained from stearic acid, isostearic acid or oleic acid; castor oil; castor oil derivatives; and the like. These can be used alone or in admixture of at least two kinds.

The preferred examples of an oxyalkylene chain in the alkylene oxide adduct of an ester (d) obtained from a polyhydric alcohol and a fatty acid include an oxyalkylene chain represented by the formula (1):

$$-(CH_2-CHR^1-O)_n- \qquad (I)$$

wherein $R^1$ is hydrogen atom, methyl group or ethyl group; and n is an integer of 1 to 100.

Representative examples of the alkylene oxide adduct of an ester (d) obtained from a polyhydric alcohol and a fatty acid include polyoxyethylene sorbitol fatty acid esters, polyoxyethylene castor oil derivatives, polyoxyethylene hydrogenated castor oil derivatives, polyoxyethylene glycerol fatty acid esters, and the like.

Concrete examples of the above-mentioned polyoxyethylene sorbitol fatty acid esters include a polyoxyethylene sorbitol tetraoleate; polyoxyethylene sorbitol pentaoleate; polyoxyethylene sorbitol isostearate; polyoxyethylene sorbitol hexastearate; and the like. These can be used alone or in admixture of at least two kinds.

Concrete examples of the above-mentioned polyoxyethylene castor oil derivatives and polyoxyethylene hydrogenated castor oil derivatives include polyoxyethylene castor oil, polyoxyethylene hydrogenated castor oil, polyoxyethylene hydrogenated castor oil laurate, polyoxyethylene hydrogenated castor oil isostearate, polyoxyethylene hydrogenated castor oil triisostearate, and the like. These can be used alone or in admixture of at least two kinds.

Concrete examples of the above-mentioned polyoxyethylene glycerol fatty acid esters include polyoxyethylene glyceryl monostearate, polyoxyethylene glyceryl distearate, polyoxyethylene glyceryl tristearate, polyoxyethylene glyceryl oleate, polyoxyethylene glyceryl dioleate, polyoxyethylene glyceryl trioleate, polyoxyethylene glyceryl isostearate, polyoxyethylene glyceryl diisostearate, polyoxyethylene glyceryl triisostearate, and the like. These can be used alone or in admixture of at least two kinds.

Among the alkylene oxide adducts of an ester (d) obtained from a polyhydric alcohol and a fatty acid, polyoxyethylene hydrogenated castor oil, polyoxyethylene castor oil, polyoxyethylene hydrogenated castor oil isostearate, polyoxyethylene hydrogenated castor oil triisostearate, and polyoxyethylene sorbitol tetraoleate are preferable, because a carboxyl group-containing polymer composition having a desired water solubility can be obtained in a small amount, and a thickening effect is imparted to a neutralized viscous solution prepared by dissolving the carboxyl group-containing polymer composition, with maintaining high transparency of the neutralized viscous solution.

The amount of the compound (B) which is at least one of the ester (c) obtained from a polyhydric alcohol and a fatty acid and the alkylene oxide adduct of an ester (d) obtained from a polyhydric alcohol and a fatty acid on the basis of 100 parts by weight of the carboxyl group-containing polymer composition (A), is not less than 0.01 parts by weight, preferably not less than 0.1 parts by weight, from the viewpoint of improving solubility of the carboxyl group-containing polymer composition of the present invention in water, and the amount is not more than 20 parts by weight, preferably not more than 10 parts by weight, from the viewpoint of sufficiently exhibiting the thickening effect of the carboxyl group-containing polymer composition of the present invention. The amount of the compound (B) is 0.01 to 20 parts by weight, preferably 0.1 to 10 parts by weight.

The process for preparing the carboxyl group-containing polymer composition of the present invention is not limited to specified ones. The carboxyl group-containing polymer composition of the present invention can be, for instance, prepared by the following methods:

(1) a process for polymerizing an α,β-unsaturated carboxylic acid (a) with a compound (b) having at least two ethylenic unsaturated groups in the coexistence of an ester (c) obtained from a polyhydric alcohol and a fatty acid and/or an alkylene oxide adduct of an ester (d) obtained from a polyhydric alcohol and a fatty acid in a desired amount from an initial stage of the polymerization;

(2) a process comprising mixing an α,β-unsaturated carboxylic acid (a) with a compound (b) having at least two ethylenic unsaturated groups, and polymerizing the α,β-unsaturated carboxylic acid (a) with the compound (b) having at least two ethylenic unsaturated groups, with continuously adding an ester (c) obtained from a polyhydric alcohol and a fatty acid and/or an alkylene oxide adduct of an ester (d) obtained from a polyhydric alcohol and a fatty acid to the resulting mixture;

(3) a process comprising previously polymerizing an α,β-unsaturated carboxylic acid (a) with a compound (b) having at least two ethylenic unsaturated groups to give a slurry, and after the termination of the polymerization, adding an ester (c) obtained from a polyhydric alcohol and a fatty acid and/or an alkylene oxide adduct of an ester (d) obtained from a polyhydric alcohol and a fatty acid to the resulting slurry; and (4) a process comprising mixing an α,β-unsaturated carboxylic acid (a), with an ester (c) obtained from a polyhydric alcohol and a fatty acid and/or an alkylene oxide adduct of an ester (d) obtained from a polyhydric alcohol and a fatty acid; and thereafter carrying out the polymerization, with continuously adding a compound (b) having at least two ethylenic unsaturated groups to the resulting mixture.

More specifically, for instance, in the above-mentioned process (1), a reaction vessel equipped with a stirrer, a thermometer, a nitrogen gas inlet tube and a reflux condenser is charged with an α,β-unsaturated carboxylic acid (a), a compound (b) having at least two ethylenic unsaturated groups, an ester (c) obtained from a polyhydric alcohol and a fatty acid and/or an alkylene oxide adduct of an ester (d) obtained from a polyhydric alcohol and a fatty acid, a radical polymerization initiator and an inert solvent, each component being previously weighed to a desired amount.

The contents inside the reaction vessel are mixed with stirring, to have a homogeneous composition. Thereafter, in order to remove oxygen gas contained in the upper space of the reaction vessel and dissolved oxygen dissolved in the contents, nitrogen gas is blown into the contents. The polymerization reaction can be carried out by heating at 20° to 120° C., preferably 30° to 90° C. with a warm bath or the like. The polymerization reaction is usually terminated at 2 to 10 hours.

After the termination of the polymerization reaction, an inert solvent is distilled from the reaction solution, with heating the reaction mixture under reduced pressure or normal pressure, whereby a carboxyl group-containing polymer composition can be obtained in the form of fine white powders.

It is desired that the total charged amount of the α,β-unsaturated carboxylic acid and the compound having at least two ethylenic unsaturated groups in the entire charged amounts of the α,β-unsaturated carboxylic acid (a), the compound (b) having at least two ethylenic unsaturated groups, the ester (c) obtained from a polyhydric alcohol and a fatty acid, the alkylene oxide adduct of an ester (d) obtained from a polyhydric alcohol and a fatty acid, the radical polymerization initiator and the inert solvent is not less than 1% by weight, preferably not less than 5% by weight, from the viewpoints of increasing volume efficiency and improving productivity, and that the amount is not more than 30% by weight, preferably not more than 25% by weight, from the viewpoints of the avoidance of the increase in the viscosity of the slurry which is caused by the remarkable precipitation of the polymer in the progress of the polymerization reaction, and smooth progress of the reaction. The preferred total charged amount is 1 to 30% by weight, more preferably 5 to 25% by weight.

The inert solvent is not limited to specified ones, as long as the solvent dissolves the α,β-unsaturated carboxylic acid (a) and the compound (b) having at least two ethylenic unsaturated groups, but does not dissolve the resulting carboxyl group-containing polymer composition. Representative examples of the inert solvent include aliphatic hydrocarbons having 2 to 8 carbon atoms which may be substituted with a halogen, such as ethylene dichloride, normal pentane, normal hexane, isohexane, normal heptane, normal octane and isooctane; alicyclic hydrocarbons having 5 to 7 carbon atoms, such as cyclopentane, methyl cyclopentane, cyclohexane and methyl cyclohexane; aromatic hydrocarbons which may be substituted with a halogen, such as benzene, toluene, xylene and chlorobenzene; alkyl acetates such as ethyl acetate and isopropyl acetate; ketone compounds such as methyl ethyl ketone and methyl isobutyl ketone; and the like. These can be used alone or in admixture of at least two kinds. Among these inert solvents, ethylene dichloride, normal hexane, cyclohexane, normal heptane and ethyl acetate are preferable, from the viewpoints of stable quality and easy availability.

The kinds of the radical polymerization initiator are not limited to specified ones. Concrete examples thereof include α,α-azoisobutyronitrile, 2,2'-azobis-2,4-dimethylvaleronitrile, dimethyl-2,2'-azobisisobutyrate, benzoyl peroxide, lauroyl peroxide, cumene hydroperoxide, tertiary butyl hydroperoxide, and the like.

The amount of the radical polymerization initiator cannot be absolutely determined, because the amount differs depending upon its kinds, reaction temperature and the like. It is desired that the amount of the radical initiator on the basis of a total amount of the α,β-unsaturated carboxylic acid and the compound having at least two ethylenic unsaturated groups is usually not less than 0.1% by weight, preferably not less than 0.3% by weight, from the viewpoint of increasing the polymerization reaction rate, and that the amount is usually not more than 10% by weight, preferably not more than 3% by weight, in order that removal of heat can be facilitated during the polymerization reaction. The preferred amount of the radical polymerization initiator is 0.1 to 10% by weight, more preferably 0.3 to 3% by weight.

It is preferable that oxygen is previously removed from the reaction system, because the existence of oxygen during the reaction would impair the reaction. Therefore, it is preferable that the atmosphere during the reaction is, for instance, an inert gas atmosphere such as nitrogen gas or argon gas, from the viewpoint of avoidance of influence by the oxygen.

Thus, the carboxyl group-containing polymer composition of the present invention is obtained. A neutralized viscous solution can be obtained by, for instance, dissolving the carboxyl group-containing polymer composition of the present invention in water, and thereafter adjusting the pH of the aqueous solution to 4 to 11 with a base such as sodium hydroxide or triethanolamine. This neutralized viscous solution has excellent thickening property as compared with that prepared by using a conventional cross-linked carboxyl group-containing polymer.

Further, the carboxyl group-containing polymer composition of the present invention is less likely to generate undissolved powder lumps when dissolved in water, as compared to that of a conventional cross-linked carboxyl group-containing polymer, and the polymer composition shows excellent solubility in water. Also, since the viscosity of the aqueous solution before neutralization is very low, the polymer composition can be dissolved in water in a high concentration.

Although the function for exhibiting the excellent solubility of the carboxyl group-containing polymer composition of the present invention as described above has not yet been clarified at present, it is probably assumed to be as follows: An ether bond or hydroxyl group of the ester (c) obtained from a polyhydric alcohol and a fatty acid, or an ethylene oxide group of the alkylene oxide adduct of an ester (d) obtained from a polyhydric alcohol and a fatty acid, and carboxyl group of the carboxyl group-containing polymer associate to form a molecular aggregate, and an adjacent hydrophobic group (hydrocarbon compound) partially makes the carboxyl group-containing polymer hydrophobic, so that initial hydration of the carboxyl group-containing polymer is suppressed. As a result, there is exhibited an excellent solubility such that undissolved powder lumps do not tend to be generated.

Although the function for exhibiting the high thickening effect of the carboxyl group-containing polymer composition of the present invention as described above has not yet been clarified at present, it is probably assumed to be as follows. The ester (c) obtained from a polyhydric alcohol and a fatty acid or the alkylene oxide adduct of an ester (d) obtained from a polyhydric alcohol and a fatty acid properly forms a three-dimensional structure with hydrogen bond or ionic bond and the like, and thereby the carboxyl group-containing polymer would exhibit a higher thickening effect, as compared to the case where the carboxyl group-containing polymer is used alone.

EXAMPLES

Next, present invention will be explained in further detail below on the basis of the following Examples, without intending to limit the present invention thereto.

Example 1

A 500-mL four-necked flask equipped with a stirrer, a thermometer, a nitrogen gas inlet tube and a reflux condenser was charged with 60 g of acrylic acid as an α,β-unsaturated carboxylic acid (a), 0.42 g of pentaerythritol tetraallyl ether as a compound (b) having at least two ethylenically unsaturated groups, 3.0 g of polyoxyethylene castor oil (manufactured by NIKKO CHEMICALS CO., LTD. under the trade name of CO-3; adduct with 3 moles of ethylene oxide) as an alkylene oxide adduct of an ester (d) obtained from a polyhydric alcohol and a fatty acid, 0.009 g of azobisisobutyronitrile and 375 g of ethylene dichloride. The mixture was mixed with stirring, and thereafter nitrogen gas was blown into the solution at a flow rate of 100 ml/minute for 1 hour in order to remove oxygen gas existing in the upper space of the flask and oxygen dissolved in the resulting solution. Subsequently, a polymerization reaction was carried out for 3 hours by heating the solution to 70° to 75° C. under nitrogen gas atmosphere.

After the termination of the polymerization reaction, the slurry formed was heated to about 110° C., and ethylene dichloride was distilled, to give 60 g of a carboxyl group-containing polymer composition in the form of white fine powders.

Dissolving time without stirring and dissolving time with stirring of the resulting carboxyl group-containing polymer composition, viscosity of the solution and viscosity of the neutralized viscous solution were determined by the following methods. The results are shown in Table 1.

(1) Dissolving Time Without Stirring

A 500-ml beaker is charged with 298.5 g of ion-exchanged water, and 1.5 g of a carboxyl group-containing polymer composition is supplied to the beaker at once without stirring. Thereafter, the dissolving state is visually observed, and the time period necessitated for changing white powders of the carboxyl group-containing polymer composition into transparent is determined.

(2) Dissolving Time With Stirring

A 500-ml beaker is charged with 298.5 g of ion-exchanged water. The water is stirred at a rotational speed of 300 rpm using a stirrer equipped with 4 impeller paddles (diameter of impeller: 50 mm), and 1.5 g of a carboxyl group-containing polymer composition is supplied to the beaker at once. Thereafter, the dissolving state is visually observed, and the time period necessitated for changing white powders of the carboxyl group-containing polymer composition into transparent is determined.

(3) Viscosity of Solution

The viscosity of a 0.5% by weight solution obtained when determining the dissolving time with stirring as described in the above item (2) is determined at 25° C. using a Brookfield type rotational viscometer at 20 rpm.

(4) Viscosity of Neutralized Viscous Solution

A 0.5% by weight solution obtained when determining the dissolving time with stirring as described in the above item (2) was neutralized with sodium hydroxide to pH 7, to give a neutralized viscous solution.

The viscosity of this neutralized viscous solution is determined at 25° C. using a Brookfield type rotational viscometer at 20 rpm.

Examples 2 and 3

The same procedures as in Example 1 were carried out except that the amount of the polyoxyethylene castor oil used in Example 1 was changed to 0.6 g (Example 2) or 6.0 g (Example 3), to give 60 g (Example 2) or 67 g (Example 3) of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 1.

Example 4

A 500-ml four-necked flask equipped with a stirrer, a dropping funnel, a thermometer, a nitrogen gas inlet tube and a reflux condenser was charged with 40 g of acrylic acid as an α,β-unsaturated carboxylic acid (a), 3.0 g of polyoxyethylene castor oil (manufactured by NIKKO CHEMICALS CO., LTD. under the trade name of CO-3; adduct with 3 moles of ethylene oxide) as an alkylene oxide adduct of an ester (d) obtained from a polyhydric alcohol and a fatty acid, 0.14 g of azobisisobutyronitrile and 223 g of normal hexane. The mixture was homogeneously mixed with stirring, and thereafter nitrogen gas was blown into the solution at a flow rate of 100 ml/minute for 1 hour in order to remove oxygen existing in the upper space of the flask and oxygen dissolved in the resulting solution. Subsequently, the solution was heated to 55° to 60° C. under nitrogen gas atmosphere, and a mixed solution consisting of 0.45 g of polyallyl saccharose as a compound (b) having at least two ethylenically unsaturated groups and 10 g of normal hexane was added dropwise to the flask over a period of about 2 hours. Thereafter, the polymerization reaction was carried out for 1 hour.

After the termination of the polymerization reaction, the slurry formed was heated to about 110° C., and normal hexane was distilled, to give 40 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 1.

Example 5

The same procedures as in Example 4 were carried out except that 2.0 g of diglyceryl monooleate (manufactured by NIKKO CHEMICALS CO., LTD. under the trade name of DGMO-90) was used as an ester (c) obtained from a polyhydric alcohol and a fatty acid in place of the polyoxyethylene castor oil used in Example 4, to give 40 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 1.

Comparative Example 1

The same procedures as in Example 1 were carried out except that the polyoxyethylene castor oil used in Example 1 was not used, to give 60 g of a carboxyl group-containing polymer in the form of white fine powders. The dissolving time without stirring and the dissolving time with stirring of this carboxyl group-containing polymer, the viscosity of the solution and the viscosity of the neutralized viscous solution were determined in the same manner as in Example 1. The results are shown in Table 1.

Comparative Examples 2 and 3

The same procedures as in Example 1 were carried out except that the amount of the polyoxyethylene castor oil used in Example 1 was changed to 0.005 g (Comparative Example 2) or 15 g (Comparative Example 3), to give 60 g (Comparative Example 2) or 77 g (Comparative Example 3) of a carboxyl group-containing polymer composition in the form of white fine powders. The dissolving time without stirring and the dissolving time with stirring of this carboxyl group-containing polymer composition, the viscosity of the solution and the viscosity of the neutralized viscous solution were determined in the same manner as in Example 1. The results are shown in Table 1.

TABLE 1

| Example Nos. | Dissolving Time | | Viscosity of Solution (mPa · s) | Viscosity of Neutralized Viscous Solution (mPa · s) |
| --- | --- | --- | --- | --- |
| | Without Stirring (min.) | With Stirring (min.) | | |
| Example 1 | 20 | 3 | 2 | 59000 |
| Example 2 | 70 | 10 | 8 | 49000 |
| Example 3 | 15 | 2 | 0.8 | 45000 |
| Example 4 | 35 | 5 | 5 | 38500 |
| Example 5 | 20 | 3 | 2 | 36500 |
| Comparative Example 1 | 1000 | 150 | 680 | 38000 |
| Comparative Example 2 | 960 | 145 | 680 | 38000 |
| Comparative Example 3 | 15 | 2 | 0.1 | 26000 |

It can be seen clear from the results shown in Table 1 that according to the processes of Examples 1 to 5, there can be obtained a carboxyl group-containing polymer composition showing short dissolving time even without stirring, giving a resulting solution a very low viscosity, and giving a very high viscosity to a neutralized viscous solution prepared by neutralizing this solution, since a given amount of an ester (c) obtained from a polyhydric alcohol and a fatty acid or an alkylene oxide adduct of an ester (d) obtained from a polyhydric alcohol and a fatty acid is used.

Example 6

The same procedures as in Example 1 were carried out except that 3.0 g of a polyoxyethylene hydrogenated castor oil (manufactured by NIKKO CHEMICALS CO., LTD. under the trade name of HCO-10; adduct with 10 moles of ethylene oxide) was added in place of the polyoxyethylene castor oil used in Example 1, to give 61 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 2.

Example 7

The same procedures as in Example 1 were carried out except that 3.0 g of polyoxyethylene hydrogenated castor oil isostearate (manufactured by NOF CORPORATION under the trade name of UNIOX HC40 MIS; adduct with 10 moles of ethylene oxide) was added in place of the polyoxyethylene castor oil used in Example 1, to give 61 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 2.

Example 8

The same procedures as in Example 1 were carried out except that 3.0 g of polyoxyethylene sorbitol tetraoleate (manufactured by NIKKO CHEMICALS CO., LTD. under the trade name of GO4; adduct with 6 moles of ethylene oxide) was added in place of the polyoxyethylene castor oil used in Example 1, to give 61 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 2.

Example 9

The same procedures as in Example 1 were carried out except that 3.0 g of polyoxyethylene sorbitol hexastearate (manufactured by NIKKO CHEMICALS CO., LTD. under the trade name of GS-6; adduct with 6 moles of ethylene oxide) was added in place of the polyoxyethylene castor oil used in Example 1, to give 61 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 2.

Example 10

The same procedures as in Example 1 were carried out except that 3.0 g of polyoxyethylene glyceryl monooleate (manufactured by NIKKO CHEMICALS CO., LTD. under the trade name of TMGO-15; adduct with 15 moles of ethylene oxide) was added in place of the polyoxyethylene castor oil used in Example 1, to give 61 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 2.

Example 11

The same procedures as in Example 1 were carried out except that 3.0 g of polyoxyethylene hydrogenated castor oil triisostearate (trade name: RWIS-360; adduct with 60 moles of ethylene oxide; manufactured by Nihon Emulsion Co., Ltd.) was added in place of the polyoxyethylene castor oil used in Example 1, to give 61 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 2.

Example 12

The same procedures as in Example 1 were carried out except that a mixture of 1.5 g of polyoxyethylene hydrogenated castor oil triisostearate (manufactured by Nihon Emulsion Co., Ltd. under the trade name of RWIS-360; adduct with 60 moles of ethylene oxide) and 1.5 g of polyoxyethylene castor oil (manufactured by NIKKO CHEMICALS CO., LTD. under the trade name of CO-3; adduct with 3 moles of ethylene oxide) was added in place of the polyoxyethylene castor oil used in Example 1, to give 62 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 2.

Example 13

The same procedures as in Example 1 were carried out except that a mixture of 1.5 g of polyoxyethylene hydrogenated castor oil triisostearate (manufactured by Nihon Emulsion Co., Ltd. under the trade name of RWIS-360; adduct with 60 moles of ethylene oxide) and 1.5 g of decaglyceryl pentaoleate (manufactured by NIKKO CHEMICALS CO., LTD. under the trade name of Decaglyn-5-0) as an ester (c) obtained from a polyhydric alcohol and a fatty acid was added in place of the polyoxyethylene castor oil used in Example 1, to give 62 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 2.

Example 14

The same procedures as in Example 1 were carried out except that 57.6 g of acrylic acid was used as an α,β-unsaturated carboxylic acid (a), and 2.4 g of lauroyl methacrylate was used as an α,β-unsaturated compound, to give 63 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 2.

Comparative Example 4

The same procedures as in Example 1 were carried out except that 3.0 g of stearyl alcohol (reagent) was added in place of the polyoxyethylene castor oil used in Example 1, to give 60 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 2.

TABLE 2

| Example Nos. | Dissolving Time Without Stirring (min.) | Dissolving Time With Stirring (min.) | Viscosity of Solution (mPa · s) | Viscosity of Neutralized Viscous Solution (mPa · s) |
|---|---|---|---|---|
| Example 6 | 50 | 7 | 10 | 53000 |
| Example 7 | 40 | 6 | 12 | 51000 |
| Example 8 | 30 | 4 | 10 | 55000 |
| Example 9 | 80 | 12 | 30 | 58000 |
| Example 10 | 50 | 7 | 12 | 56000 |
| Example 11 | 7 | 3 | 2 | 58000 |
| Example 12 | 18 | 3 | 6 | 51000 |
| Example 13 | 14 | 2 | 4 | 52500 |
| Example 14 | 30 | 14 | 30 | 48500 |
| Comparative Example 4 | 1000 | 150 | 600 | 40000 |

It can be seen from the results shown in Table 2 that according to Examples 6 to 12, there can be obtained a carboxyl group-containing polymer composition showing short dissolving time even without stirring, giving a resulting solution a very low viscosity, and giving a neutralized viscous solution prepared by neutralizing this solution a very high viscosity as in the case of Example 1, even when a polyoxyethylene hydrogenated castor oil, an polyoxyethylene hydrogenated castor oil isostearate, polyoxyethylene sorbitol tetraoleate, polyoxyethylene sorbitol hexastearate, polyoxyethylene glyceryl monooleate, polyoxyethylene hydrogenated castor oil triisostearate or polyoxyethylene castor oil triisostearate is used in place of the polyoxyethylene castor oil used in Example 1 as an alkylene oxide adduct of an ester (d) obtained from a polyhydric alcohol and a fatty acid, as compared with Comparative Example 4 where a conventionally used polyhydric alcohol (strearyl alcohol) is used.

In addition, according to Example 13, it can be seen that there can be obtained a carboxyl group-containing polymer composition showing short dissolving time even without stirring, giving a resulting solution a very low viscosity, and a neutralized viscous solution prepared by neutralizing this solution a very high viscosity as in the case of Example 1, even when an ester (c) obtained from a polyhydric alcohol and a fatty acid and an alkylene oxide adduct of an ester (d) obtained from a polyhydric alcohol and a fatty acid are used together.

Also, according to Example 14, it can be seen that there can be obtained, a carboxyl group-containing polymer composition showing short dissolving time even without stirring, giving a resulting solution a very low viscosity, and giving a neutralized viscous solution prepared by neutralizing this solution a very high viscosity as in the case of Example 1, even when lauroyl methacrylate is used together as an α,β-unsaturated compound.

Example 15

The same procedures as in Example 1 were carried out except that 3.0 g of decaglyceryl decaoleate (manufactured by NIKKO CHEMICALS CO., LTD. under the trade name of Decaglyn-10-O) was added as an ester (c) obtained from a polyhydric alcohol and a fatty acid in place of the polyoxyethylene castor oil used in Example 1, to give 60 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 3.

Example 16

The same procedures as in Example 1 were carried out except that 3.0 g of decaglyceryl pentaoleate (manufactured by NIKKO CHEMICALS CO., LTD. under the trade name of Decaglyn-5-O) was added as an ester (c) obtained from a polyhydric alcohol and a fatty acid in place of the polyoxyethylene castor oil used in Example 1, to give 60 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 3.

Example 17

The same procedures as in Example 1 were carried out except that 3.0 g of decaglyceryl monooleate (manufactured by NIKKO CHEMICALS CO., LTD. under the trade name of Decaglyn-1-O) was added as an ester (c) obtained from a polyhydric alcohol and a fatty acid in place of the polyoxyethylene castor oil used in Example 1, to give 60 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 3.

Example 18

The same procedures as in Example 1 were carried out except that 3.0 g of hexaglyceryl monooleate (manufactured by NIKKO CHEMICALS CO., LTD. under the trade name of Hexaglyn-1-O) was added as an ester (c) obtained from a polyhydric alcohol and a fatty acid in place of the polyoxyethylene castor oil used in Example 1, to give 60 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 3.

Example 19

The same procedures as in Example 1 were carried out except that 3.0 g of diglyceryl monooleate (manufactured by NIKKO CHEMICALS CO., LTD. under the trade name of DGMO-90) was added as an ester (c) obtained from a polyhydric alcohol and a fatty acid in place of the polyoxyethylene castor oil used in Example 1, to give 60 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 3.

Example 20

The same procedures as in Example 1 were carried out except that 3.0 g of glyceryl dioleate (manufactured by NIKKO CHEMICALS CO., LTD. under the trade name of DGO-80) was added as an ester (c) obtained from a polyhydric alcohol and a fatty acid in place of the polyoxyethylene castor oil used in Example 1, to give 60 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 3.

Comparative Example 5

The same procedures as in Example 1 were carried out except that 3.0 g of glycerol was added in place of the polyoxyethylene castor oil used in Example 1, to give 59 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 3.

Comparative Example 6

The same procedures as in Example 1 were carried out except that 3.0 g of hexaglycerol was added in place of the polyoxyethylene castor oil used in Example 1, to give 59 g of a carboxyl group-containing polymer composition in the form of white fine powders.

The dissolving time without stirring and the dissolving time with stirring of the resulting carboxyl group-containing polymer composition, the viscosity of the solution and the viscosity of the neutralized viscous solution were determined in the same manner as in Example 1. The results are shown in Table 3.

TABLE 3

| Example Nos. | Dissolving Time | | Viscosity of Solution (mPa · s) | Viscosity of Neutralized Viscous Solution (mPa · s) |
| --- | --- | --- | --- | --- |
| | Without Stirring (min.) | With Stirring (min.) | | |
| Example 15 | 20 | 3 | 2 | 66000 |
| Example 16 | 20 | 3 | 2 | 58000 |
| Example 17 | 40 | 6 | 10 | 58000 |
| Example 18 | 35 | 5 | 20 | 57000 |
| Example 19 | 35 | 5 | 150 | 58000 |
| Example 20 | 35 | 5 | 10 | 50000 |
| Comparative Example 5 | 935 | 130 | 940 | 42000 |
| Comparative Example 6 | 900 | 120 | 840 | 40000 |

It can be seen from the results shown in Table 3 that there can be obtained a carboxyl group-containing polymer composition showing short dissolving time in any cases of stirring and not stirring, giving a resulting solution a very low viscosity, and giving a neutralized viscous solution prepared by neutralizing this solution a very high viscosity, when various esters (c) obtained from polyhydric alcohols and fatty acids are used in place of the alkylene oxide adduct of an ester (d) obtained from a polyhydric alcohol and a fatty acid used in Example 1.

INDUSTRIAL APPLICABILITY

Since the carboxyl group-containing polymer composition of the present invention exhibits excellent solubility in water, there is exhibited an excellent effect that the dissolving time can be remarkably shortened without using a specialized dissolving device.

In addition, when an aqueous solution prepared by dissolving the carboxyl group-containing polymer composition of the present invention in water is neutralized with a proper base, a neutralized viscous solution having a very high viscosity is obtained.

Therefore, the carboxyl group-containing polymer composition of the present invention can be suitably used as a thickening agent for various aqueous solutions.

What is claimed is:

1. A water soluble carboxyl group-containing polymer composition, comprising 100 parts by weight of a carboxyl group-containing polymer (A) prepared by copolymerizing an α,β-unsaturated carboxylic acid (a) with a compound (b) having at least two ethylenic unsaturated groups; and 0.01 to 20 parts by weight of at least one compound (B) selected from the group consisting of an ester (c) obtained from a polyhydric alcohol and a fatty acid, and an alkylene oxide adduct of an ester (d) obtained from a polyhydric alcohol and a fatty acid, wherein said compound (b) having at least two ethylenic unsaturated groups is at least one compound selected from the group consisting of pentaerythritol tetraallyl ether, tetraallyloxyethane and polyallyl saccharose; said polyhydric alcohol used in the ester (c) obtained from a polyhydric alcohol and a fatty acid is at least one polyhydric alcohol selected from the group consisting of glycerol, polyglycerol and sorbitol; and said polyhydric alcohol used in the alkylene oxide adduct (d) of an ester obtained from a polyhydric alcohol and a fatty acid is at least one polyhydric alcohol selected from the group consisting of glycerol, polyglycerol and sorbitol.

2. The water-soluble carboxyl group-containing polymer composition according to claim 1, wherein the α,β-unsaturated carboxylic acid (a) is acrylic acid.

3. The water soluble carboxyl group-containing polymer composition according to claim 1, wherein the ester (c) obtained from a polyhydric alcohol and a fatty acid is an ester obtained from glycerol or polyglycerol, and stearic acid, isostearic acid or oleic acid.

4. The water soluble carboxyl group-containing polymer composition according to claim 1, wherein the alkylene oxide adduct of an ester (d) obtained from a polyhydric alcohol and a fatty acid is at least one compound selected from the group consisting of polyoxyethylene sorbitol fatty acid esters, polyoxyethylene castor oil derivatives, polyoxyethylene hydrogenated castor oil derivatives and polyoxyethylene glycerol fatty acid esters.

5. The water-soluble carboxyl group-containing polymer composition according to claim 1, wherein carboxyl group-containing polymer (A) is prepared by copolymerizing in an inert solvent the α,β-unsaturated carboxylic acid (a) with the compound (b) having at least two ethylenic unsaturated groups.

6. The water-soluble carboxyl group-containing polymer composition according to claim 5, wherein said inert solvent dissolves the α,β-unsaturated carboxylic acid (a) and the compound (b) having at least two ethylenic unsaturated groups, but does not dissolve the resulting carboxyl group-containing polymer composition.

7. The water-soluble carboxyl group-containing polymer composition according to claim 6, wherein said inert solvent is at least one solvent selected from the group consisting of aliphatic hydrocarbons having 2 to 8 carbon atoms, which may be substituted with a halogen, alicyclic hydrocarbons having 5 to 7 carbon atoms, and aromatic hydrocarbons, which may be substituted with a halogen, alkyl acetates, and ketone compounds.

8. The water-soluble carboxyl group-containing polymer composition according to claim 6, wherein said inert solvent is at least one solvent selected from the group consisting of ethylene di-chloride, normal hexane, cyclohexane, normal heptane and ethyl acetate.

* * * * *